(12) United States Patent
Schechter et al.

(10) Patent No.: US 9,294,281 B2
(45) Date of Patent: Mar. 22, 2016

(54) UTILIZATION OF A PROTECTED MODULE TO PREVENT OFFLINE DICTIONARY ATTACKS

(75) Inventors: Stuart Edward Schechter, Kirkland, WA (US); David Alexander Molnar, Bellevue, WA (US); Jacob Rubin Lorch, Bellevue, WA (US); Barry Clayton Bond, Redmond, WA (US); Bryan Jeffrey Parno, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/370,331

(22) Filed: Feb. 10, 2012

(65) Prior Publication Data

US 2013/0212385 A1    Aug. 15, 2013

(51) Int. Cl.
*H04L 9/32* (2006.01)
*G06F 21/31* (2013.01)

(52) U.S. Cl.
CPC .............. *H04L 9/3226* (2013.01); *G06F 21/31* (2013.01); *H04L 9/3239* (2013.01); *G06F 2221/2115* (2013.01)

(58) Field of Classification Search
CPC ...... G06F 21/31; H04L 9/3239; H04L 9/3226
USPC ....................................................... 713/168
See application file for complete search history.

(56) References Cited

U.S. PATENT DOCUMENTS

| | | | |
|---|---|---|---|
| 5,729,594 A * | 3/1998 | Klingman ................. | 379/93.12 |
| 5,825,884 A * | 10/1998 | Zdepski et al. ................. | 705/78 |
| 6,021,201 A * | 2/2000 | Bakhle et al. ................. | 713/189 |
| 6,064,736 A * | 5/2000 | Davis ...................... | G06F 21/31 |
| | | | 380/30 |
| 2003/0188200 A1* | 10/2003 | Paquin et al. ................. | 713/202 |
| 2005/0010758 A1 | 1/2005 | Landrock et al. | |
| 2005/0132226 A1* | 6/2005 | Wheeler ................. | H04L 9/088 |
| | | | 726/4 |
| 2005/0138389 A1 | 6/2005 | Catherman et al. | |
| 2006/0059363 A1* | 3/2006 | Mese ..................... | G06F 21/31 |
| | | | 713/185 |
| 2011/0087890 A1* | 4/2011 | Munsil et al. ................. | 713/184 |
| 2011/0252466 A1 | 10/2011 | Le Saint et al. | |

OTHER PUBLICATIONS

George, Patrick, "User Authentication with Smart Cards in Trusted Computing Architecture", Retrieved at <<http://citeseerx.ist.psu.edu/viewdoc/download?doi=10.1.1.59.6034&rep=rep1&type=pdf>>, 2004, pp. 1-7.

Mattson, Ulf, T., "Key Management for Enterprise Data Encryption",Retrieved at <<http://xml.coverpages.org/Mattsson-SSRN-id1051481.pdf>>, 2007, pp. 1-7.

Lorch, et al., "A Hardware-Secured Credential Repository for Grid PKIs", Retrieved at <<http://ieeexplore.ieee.org/stamp/stamp.jsp?tp=&arnumber=1336679>>, Proceedings of International Symposium on Cluster Computing and the Grid, Apr. 19, 2004-Apr. 22, 2004, 2004, pp. 640-647.

(Continued)

*Primary Examiner* — Peter Shaw
(74) *Attorney, Agent, or Firm* — Alin Corie; Sandy Swain; Micky Minhas

(57) ABSTRACT

Various technologies pertaining to authenticating a password in a manner that prevents offline dictionary attacks are described. A protected module, which can be a hardware security module, a trusted platform module, or the like, is in communication with an authentication server. The protected module comprises a key that is restricted to the protected module. The key is employed in connection with authenticating the password on the protected module.

20 Claims, 7 Drawing Sheets

(56) References Cited

OTHER PUBLICATIONS

Stajano, Frank, "Pico: No More Passwords!", Retrieved at <<http://www.cl.cam.ac.uk/~fms27/papers/2011-Stajano-pico.pdf>>, Proceedings of Security Protocols Workshop 2011, Springer LNCS, Aug. 31, 2011, pp. 1-34.

"Securing Stored Data Using Transparent Data Encryption", Retrieved at <<http://docs.oracle.com/cd/B28359_01/network.111/b28530/asotrans.htm#CJAGFAFB>>, Retrieved Date: Dec. 19, 2011, pp. 1-41.

* cited by examiner

UTILIZATION OF A PROTECTED MODULE TO PREVENT OFFLINE DICTIONARY ATTACKS

BACKGROUND

Utilizing a personal computing device and a computer executable application that is configured to transmit and receive data over a network (such as a browser), a user can register with and utilize one or more online services. Typically, these services are accessed via the user providing a username and password, and the service authenticating the password prior to allowing the user access to the service. Exemplary services include but are not limited to e-mail, instant messaging, banking, retail sales, and so forth.

Several security techniques have been employed in connection with preventing an attacker from acquiring passwords of users. Unfortunately, many users typically choose passwords that are fairly easy to remember for the user, which oftentimes cause the passwords to be fairly easy to guess. Accordingly, dictionary attacks can be employed to guess many passwords. An attacker performs a dictionary attack by setting forth numerous guesses for one or more usernames, wherein the guesses are passwords revealed to be commonly used in other systems, or expected to be likely used by the users of the target system (e.g. because the passwords use terms associated with the target system or company). Utilizing a dictionary attack, an attacker can oftentimes guess numerous passwords for varying usernames. To facilitate prevention of online dictionary attacks, authentication servers have been employed to limit a number of times that a computing device can submit an incorrect password for a username; if the number of incorrect guesses surpasses a threshold, the user account and/or the device making the guess is at least temporarily suspended from issuing login requests (guesses).

Configuring an authentication server to monitor incorrect guesses of passwords, however, does not prevent offline dictionary attacks. In an offline dictionary attack, the attacker acquires a copy of a password database retained in an authentication server (or acquires the authentication server itself). The attacker then analyzes content of the password database to determine how to guess passwords. For instance, some currently existing password databases include passwords in plain text. Accordingly, if an attacker acquires the copy of the password database, the attacker can quickly determine passwords for all users of the service. To strengthen password protection, hashing functions have been employed. The current accepted "best practice" is for a service to retain a hash that corresponds to a respective password, but not retain the password itself. In an exemplary embodiment, for a particular user, an authentication server maintains for each user a record of the username or other user identifier, a randomly generated value specific to the user's account (referred to as a salt), and a hash value: the hash value being the result of performing a one-way hash function over the concatenation of the user's password and the salt. During authentication for a proffered username and password, the authentication server re-executes the hash function over the purported password concatenated with the salt for that user's account. The resulting hash is then compared with the hash value in the database; if the values are equal, the password is determined to be a correct match and the user is authenticated.

Even utilizing the current accepted best practice, however, an attacker can copy the database values to his or her own machine and guess passwords for usernames at leisure. Furthermore, the attacker can deploy special-purpose hardware, such as field programmable gate arrays (FPGAs) or collections of graphics processing units (GPUs) to increase the rate of password guessing compared to a commodity computing device. Moreover, the administrator of the service, if an offline dictionary attack is suspected, has no mechanism to audit which passwords were issued as guesses or which accounts may have had their password successfully guessed by the attacker. Therefore, if it is ascertained that an offline dictionary attack has occurred, there is no way for the service provider to know which passwords may have been correctly guessed, thus requiring that the service be shut down and that all users of the service be notified of a potential attack.

SUMMARY

The following is a brief summary of subject matter that is described in greater detail herein. This summary is not intended to be limiting as to the scope of the claims.

Described herein are various technologies pertaining to the utilization of a protected module in an authentication server to facilitate the prevention of offline dictionary attacks. The protected module is employed to retain a key (e.g., a symmetric key, a public key, or other suitable cryptographic key), wherein the key can be concatenated with a user password (and possibly other data) to generate a string, and a hash function (e.g., a one-way hash function) can be executed over the string to generate a hash value. In another exemplary embodiment, the key can be utilized as a key to an encryption algorithm, and the password or a hash thereof can be encrypted utilizing the key. The key is restricted to remain inside the protected module. In an exemplary embodiment, the protected module can be a hardware security module, which is a type of secure cryptographic coprocessor that is targeted at managing digital keys, accelerating cryptographic algorithms, and providing access control for critical keys for server applications. In another exemplary embodiment, the protected module can be a Trusted Platform Module, which is a tool that offers facilities for secured generation of cryptographic keys as well as limitation of their use. The employment of a trusted protected module facilitates prevention of offline dictionary attacks, as the key employed in connection with a hash function or encryption algorithm is restricted to the protected module (e.g., the key remains in the protected module).

In an exemplary embodiment, when a user registers with a service, the user can set forth a username and password. A registration server receives the username and password and transmits the password (and optionally other data) to the protected module. The protected module includes a key that is restricted to the protected module, and the protected module executes a hash function over a concatenation of the received password and the key (and optionally other data) to generate a hash value. The protected module transmits the hash value to the registration server. The registration server discards the password received from the user and retains the hash value in correlation with the username or other user identifier. As the key is restricted to the protected module, even if a malicious attacker were able to acquire the password database, the attacker would be unable to guess passwords, as the attacker has no manner of obtaining the key. Further, if the attacker were to physically acquire the protected module, as is readily understood by one skilled in the art, the protected module is designed to destroy data if a software and/or hardware attack is undertaken thereon.

During authentication, a username and purported corresponding password is received from a client computing device. An authentication server accesses the password database, utilizing the username as an index thereto, and locates the hash value that corresponds to the username. The authentication server then transmits the hash and purported password (and optionally other data) to the protected module, which executes the hash function over the concatenation of the key and the purported password to generate a second hash value. The value received from the authentication server is then compared with the second hash value to ascertain whether the password set forth by the client computing device matches the proper password for the username.

In another exemplary embodiment, the protected module can be employed to execute an encryption algorithm over a hash generated by the registration server. In such an embodiment, during registration a user can set forth a username and password to a registration server. The registration server, responsive to receipt of a registration request, can generate a salt, which is a randomly generated value that corresponds to the username. The registration server subsequently executes a hash function over the concatenation of the password set forth by the user and the salt to generate a hash value, and transmits the hash value to the protected module. Responsive to receiving the hash value, the protected module can execute an encryption algorithm over the hash value utilizing the key as a key to the encryption algorithm, thereby generating an encrypted hash value. The protected module can then transmit the encrypted hash value back to the registration server, and the registration server can store the encrypted hash value in a password database in correspondence with the username (or other user identifier). The registration server discards the password received from the user. Again, if an attacker were to obtain a copy of the password database, the attacker would be unable to guess passwords, as the attacker has no way of acquiring the key utilized to encrypt the hash value.

During authentication, an authentication server receives a username and purported password from a client computing device. The authentication server, responsive to receiving the username and password, accesses the password database and retrieves the encrypted hash and salt that corresponds to the username. The authentication server transmits the purported password, encrypted hash, and salt to the protected module. The protected module decrypts the encrypted hash utilizing the encryption key that is restricted thereto, thus generating a first hash value. The protected module then executes the hash function of the concatenation of the purported password and the salt, thereby generating a second hash value. If the first hash matches the second hash, then the protected module returns the value of "true", indicating that the client computing device has set forth the proper password and the authentication server can provide access to the service. If, however, the two hashes do not match, then the protected module returns "false", indicating that access to the user account has not been authenticated and that access to the user's account should be denied.

From the above it can be ascertained that offline dictionary attacks are thwarted, particularly in the situation where the attacker does not have physical access to the protected module. Even if physical acquisition of the protected module occurs, the protected module is configured to destroy secret data upon an attacker attempting to physically access such secret data. Additionally, the protected module is configured to generate an audit log that includes information pertaining to which passwords have been guessed and for which user accounts. The audit log is protected using the encryption key in the protected module.

Moreover, the protected module can employ an encrypted communication channel directly to the client computing device that is authenticating on behalf of the user—preventing the plaintext password from being available to the unprotected components of the service. This can be accomplished through the generation and transmittal of a nonce between the protected module and the client computing device, wherein a nonce is generated by the protected module with a low probability of being repeated. In such an embodiment, the protected module is additionally configured to have a public encryption key and retain the corresponding private key such that it is restricted to remain exclusively within the protected module. The nonce generated by the protected module is transmitted via the authentication server to the client computing device responsive to the client computing device initializing a session with the authentication server. The client computing device has the public key and encrypts a concatenation of a purported password and the nonce with the public key to generate ciphertext. Such ciphertext is transmitted to the authentication server, which then transmits the ciphertext together with, optionally, a user identifier and salt, to the protected module. The protected module decrypts the ciphertext utilizing the secret key to acquire the nonce. The protected module subsequently ensures that the nonce is valid; if the nonce is invalid, then authentication is denied.

Other aspects will be appreciated upon reading and understanding the attached figures and description.

DETAILED DESCRIPTION

Figure 1:
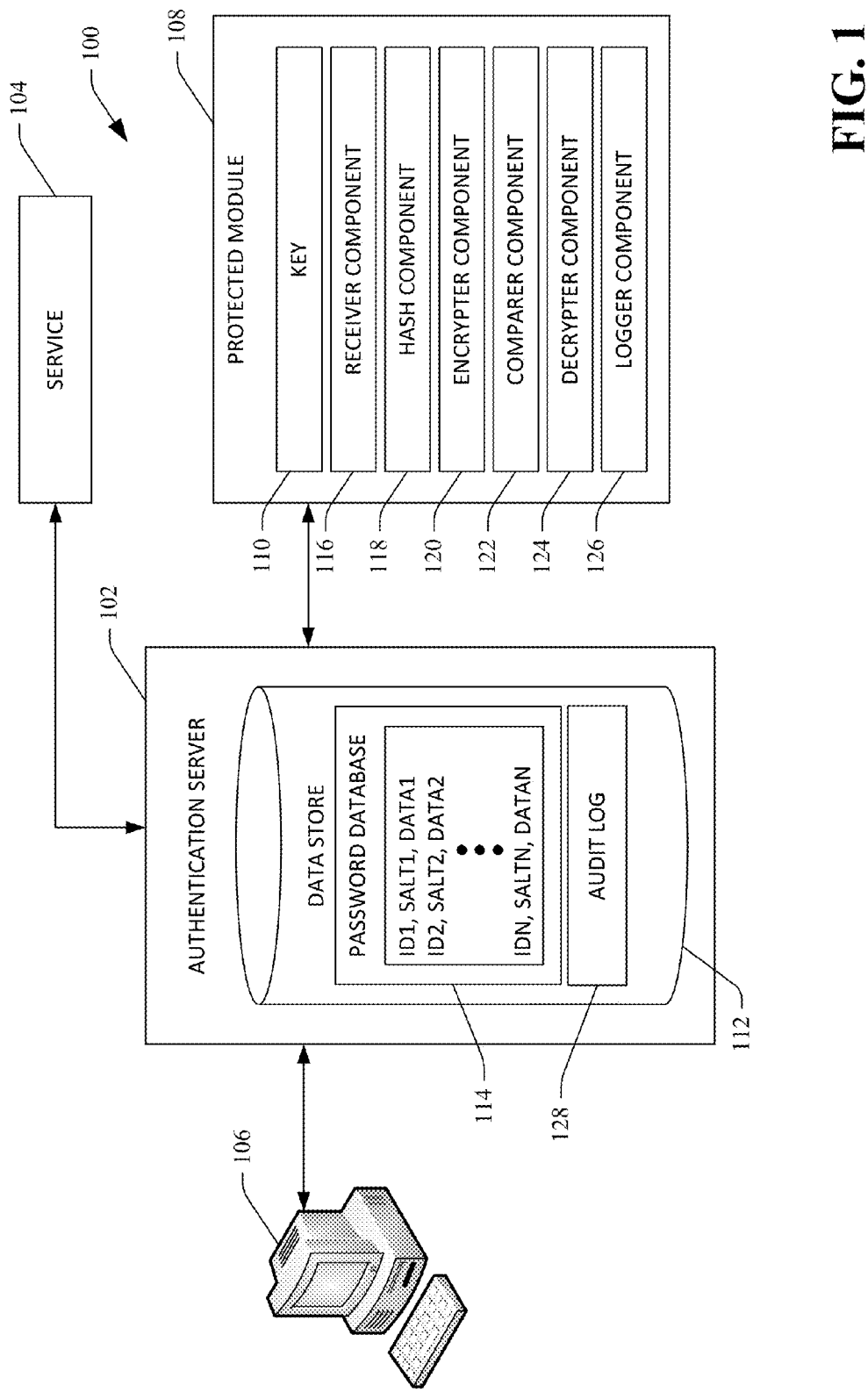
FIG. 1 is a functional block diagram of an exemplary system that facilitates prevention of offline dictionary attacks on a password database.

Various technologies pertaining to utilizing a protected module in connection with preventing offline dictionary attacks will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary system 100 that facilitates prevention of offline dictionary attacks on a password database of an authentication server is illustrated. The system 100 comprises an authentication server 102, which is configured to authenticate a password set forth by a client computing device. The authentication server 102 is configured to provide access to a service 104 to authenticated users. The service 104 may be any suitable service that can be provided to users of computing devices, including but not limited to, email services, banking services, services that sell tangible and/or intangible assets, etc. Moreover, for purposes of explanation, the authentication server 102 can be employed in connection with registering users with the service 104. Alternatively, a separate system (e.g., a registration server) can be employed to register new users with the service 104. For purposes of explanation, however, the authentication server 102 is described herein as performing tasks associated with both user registration and authentication.

The system 100 further comprises a client computing device 106 that is in communication with the authentication server 102 by way of a suitable network connection. The client computing device 106 may be or include a personal computing device, a laptop computing device, a tablet computing device, a mobile telephone, a personal digital assistant, or any other suitable computing device that can be in communication with the authentication server 102

The system 100 further comprises a protected module 108 that is in communication with the authentication server 102 by way of a suitable connection. For instance, the protected module 108 may be hardwired to the authentication server 102. In another exemplary embodiment, the protected module 108 can be in communication with the authentication server 102 by way of some suitable network connection. In an exemplary embodiment, the protected module 108 can be a hardware security module (HSM), which includes a secure cryptoprocessor that is configured to manage digital keys, accelerate cryptographic algorithms, and provide access control for keys used by server applications. Accordingly, the protected module 108 can be in the form of a plug-in card or external TCP/IP security device that can be coupled directly to the authentication server 102. In another exemplary embodiment, the protected module 108 can be a Trusted Platform Module (TPM). A TPM offers facilities for secure generation of cryptographic keys and limitations on their use. It is to be understood that the protected module 108 is not restricted to a HSM or TPM. The protected module 108 comprises a key 110 that is restricted to the protected module 108. The key 110 may be a symmetric key, a public key, a value utilized as input to a one-way hash function, or some other suitable cryptographic key. In other words, the protected module 108 is configured to retain the key 110 and to not share the key 110 with any other computing device. In an exemplary embodiment, the protected module 108 can include hardware security features that cause the protected module 108 to destroy the key 110 if it is detected that an attacker is attempting to undertake a hardware attack on the protected module 108.

Registration

Registration of a user of the client computing device 106 with the service 104 via the authentication server 102 will now be described. As mentioned above, a separate system (a registration server) can be configured to perform registration of users with the service 104. For purposes of discussion, however, the authentication server 102 shown in FIG. 1 can perform tasks typically performed by a registration server and/or authentication server.

In an exemplary embodiment, the client computing device 106 is directed to the service 104 by way of a computer-executable application on the client computing device 106. Such application can be a special-purpose application corresponding to the service 104, or may be a web browser executing on the client computing device 106 that is directed to a URL corresponding to the service 104. When signing up with the service 104, the user of the client computing device 106 can provide a username and password to the authentication server 102. The authentication server 102 comprises a data store 112 that is configured to retain a password database 114. Responsive to receiving the username and password from the client computing device 106, the authentication server 102 can create an entry for the user in the password database 114. Specifically, responsive to receiving the username and password from the client computing device 106, the authentication server 102 can retain the username and optionally generate a salt that corresponds to the username, wherein the salt is a value that can be generated at random from a relatively large pool of numbers (e.g., a random 128 bit value). The authentication server 102 then transmits the username, the salt generated for the username, and the password to the protected module 108.

In a first exemplary embodiment, the protected module 108 comprises a receiver component 116 that receives the username, salt, and password from the authentication server 102. The protected module 108 comprises a hash component 118 that is in communication with receiver component 116. The hash component 118 concatenates the password, the salt, and the key 110 and executes a hash function over such concatenation, thereby creating a first hash value for that username. The protected module 108 then transmits this first hash value to the authentication server 102, which stores the first hash value in correlation with the username (or other user identifier) and the salt. Therefore, in this exemplary embodiment, the form of the database entry is as follows:

$$\text{<username or other user identifier>, <random salt>, hash(<password>||<salt>||<key>)} \quad (1)$$

In an example, the key 110 can be the same for each user registered with the service 104. In another example, the protected module 108 can generate keys of differing values for differing user accounts.

In a second exemplary embodiment, rather than concatenating the key 110 with the password of a user, the key 110 can be employed as an encryption key (symmetric key or asymmetric key pair) to encrypt a hash of a string that includes the password of the user. For example, either the authentication server 102 or the protected module 108 can concatenate the password and the salt, and a hash function can be executed over such concatenation to generate a first hash value. The protected module 108 may further comprise an encrypter component 120 that can execute an encryption algorithm over the first hash value utilizing the encryption key 110 as the key to the encryption algorithm, thereby generating ciphertext. The protected module 108 may then transmit this ciphertext to the authentication server 102 for retention thereof. In such an embodiment, an entry in the password database 114 will have the following form:

<username or other user identifier>, <salt>, Encrypt
  (key=encryption key, value=hash
  (<password>||<salt>)) (2)

In either embodiment, offline dictionary attacks are prevented, as one must know the key 110 or appropriately guessed the key 110 (which has a very low probability) to successfully perform an offline dictionary attack on the password database 114.

Authentication

Authentication of a password is now described. Authentication is first described where the form of the database is form (1). In such an embodiment, the client computing device 106 initiates a session with the authentication server 102 in any suitable manner. The client computing device 106 transmits a username and purported password to the authentication server 102. Responsive to receiving such password, the authentication server 102 accesses the salt and first hash value that corresponds to the username set forth by the client computing device 106, and transmits the salt and the first hash value to the protected module 108. The receiver component 116 receives the purported password, the salt, and the first hash value, and the hash component 118 generates a concatenation of the purported password, the salt, and the key 110. The hash component 118 then executes the hash function over such concatenation to generate a second hash value.

The protected module 108 further comprises a comparer component 122 that compares the first hash value (the hash value in the password database 114) with the second hash value and outputs a signal to the authentication server 108 that is indicative of the results of the comparison. For example, the comparer component 122 can output a first value if the two hashes are equivalent and can output a second value if the two hash values are not equivalent. The authentication server 102 can then authenticate the purported password based upon the value received from the protected module 108.

Authentication of a password when the format of the password database 114 is form (2) is now described. In such an exemplary embodiment, the client computing device 106 sets forth a username and purported password to the authentication server 102. The authentication server 102 accesses the entry corresponding to the set forth username and transmits the salt and ciphertext in the password database 114 corresponding to such username to the protected module 108. As noted above, the ciphertext is an encryption of the concatenation of the actual password for the username and the salt, wherein the key 110 was employed as an encryption key during encryption. The receiver component 116 of the protected module 108 receives the purported password, the salt, and the ciphertext.

The protected module 108 further comprises a decrypter component 124 that is in communication with the receiver component 116. The decrypter component 124 decrypts the received ciphertext utilizing the key 110, thereby resulting in the first hash value (the hash of the concatenation of the actual password and the salt). The hash component 118 then generates a hash of the concatenation of the purported password and the salt received from the authentication server 102 to create a second hash value. The comparer component 122 then compares the first hash value with the second hash value, and outputs a signal that is indicative of the difference between the first hash value and the second hash value. If there is no difference, for instance, the comparer component 122 can output a true signal to the authentication server 102. Alternatively, if there is a difference between the two hash values, the compare component can output a value of false to the authentication server 102, which can then fail to authenticate the password set forth by the client computing device 106.

In another exemplary embodiment, and regardless of the form of entries of the password database 114, the protected module 108 can comprise a logger component 126 that generates/maintains an audit log 128, which can identify which user accounts have had passwords guessed (properly or improperly), wherein the audit log 128 can be encrypted via the encrypter component 120 utilizing the key 110. Alternatively values in the audit log 128 may be hashes of concatenations that include the key 110. Accordingly, a maintainer of the service 104 can understand, for a particular range of time, which users have accessed the service 104 and provided proper passwords. Therefore, if the authentication server 102 is compromised, reporting and notification requirements can be met by selectively providing notifications to respective users who have accessed the service 104 with proper passwords (rather than every user of the service 104). While the audit log 128 is shown as being retained in the data store 112 of the authentication server 102, it is to be understood that the audit log 128 may be retained in the protected module 108.

Additionally, in another exemplary embodiment, the protected module 108 can be employed to limit a rate at which passwords can be guessed for user accounts. For instance, the protected module 108 can review historic access requests across user accounts and limit access to one or more user accounts based at least in part upon the historic access requests. Thus, the protected module 108 can restrict access to a user account if incorrect passwords have been proffered for such account a threshold number of consecutive guesses (e.g., if three incorrect password guesses have been submitted in a row). In another exemplary embodiment, the protected module 108 can restrict access to the user account if the rate of incorrect guesses is above some threshold. The protected module 108 can analyze the audit log 128 in connection with limiting access to a user account based upon historic password guesses.

Figure 2:
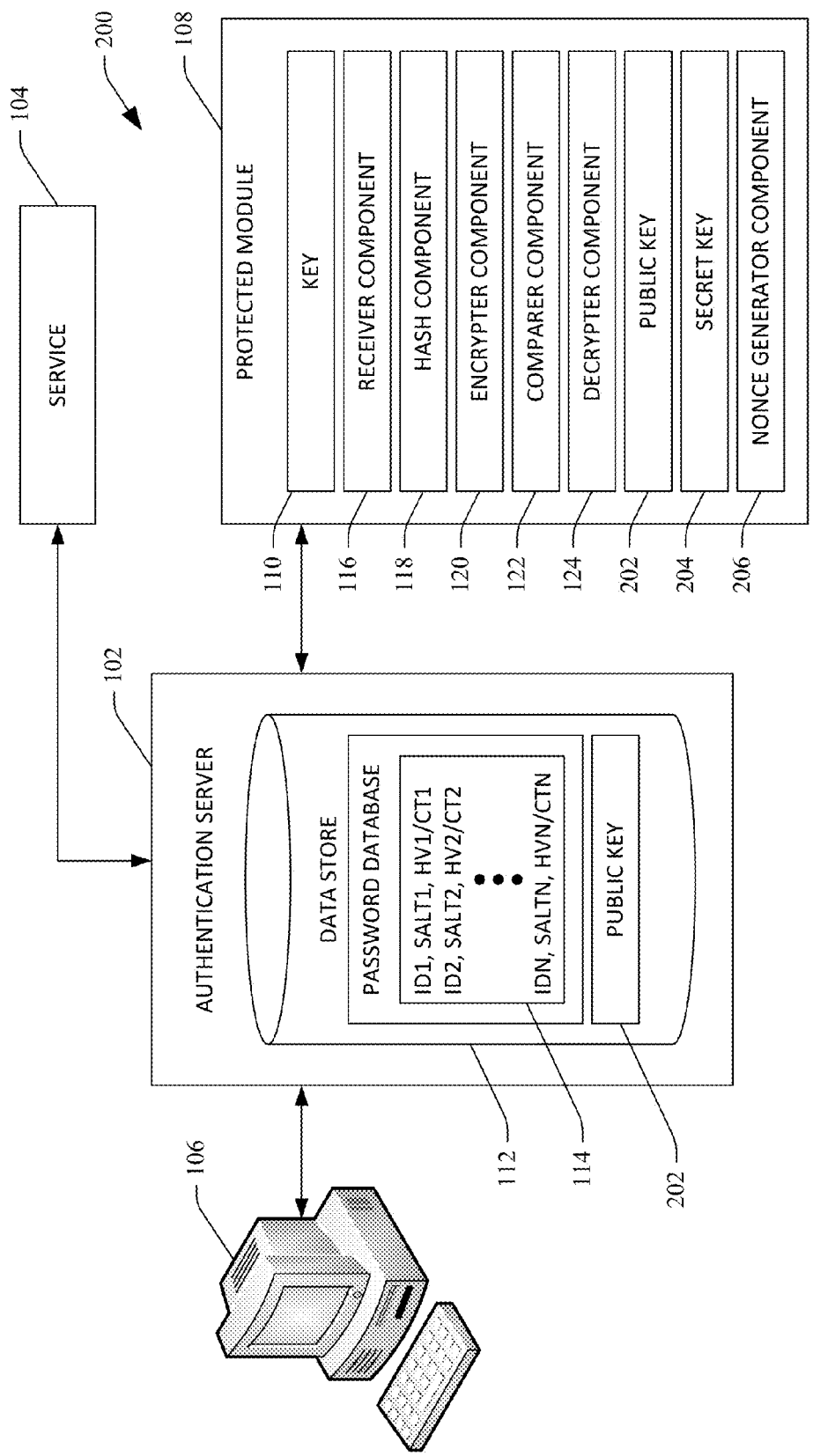
FIG. 2 is a functional block diagram of an exemplary system that facilitates establishing a secure communications channel between a client computing device and a protected module.

Now referring to FIG. 2 an exemplary system 200 that facilitates establishing a secure communications channel between the client computing device 106 and the protected module 108 is illustrated. In the exemplary system 200, the protected module 108 comprises a public key 202 and a secret key 204. The public key 202 and the secret key 204 can be created and retained in the protected module 108 at the time of creation and initialization of such module 108. The secret key 204 is restricted to the protected module 108 (e.g., the secret key 204 cannot leave the protected module 108), while the public key 202 can be shared (e.g., it can be transmitted to the authentication server 102 where it is stored in the data store 112).

The client computing device 106 initiates a session with the authentication server 102. Responsive to the authentication session being initiated, the authentication server 102 notifies the protected module 108 that an authentication session has begun. The protected module 108 comprises a nonce generator component 206 that generates a nonce responsive to receiving the notification that an authentication session has begun. As will be understood by one skilled in the art, a nonce generated by the nonce generator component 206 can be a non-repeating value, which may be chosen at random, may be the result of an increasing counter, can be a measure of time, or some other suitable method that guarantees, with high probability, that nonces are not repeated. The protected module 108 then transmits the nonce to the authentication server 102.

Responsive to the receiving the nonce, the authentication server 102 transmits the nonce and the public key 202 to the client computing device. The client computing device 106 utilizes the public key 202 to encrypt a string that includes the purported password of the client and the nonce, thus generating ciphertext. The client computing device 106 transmits the ciphertext and a corresponding username to the authentication server. The authentication server 102, responsive to receiving the username and ciphertext, accesses the password database 114 and transmits data corresponding to the username in the password database 114 to the protected module 108 (e.g., a hash value, a salt, a user ID, . . . ). The authentication server 102 also transmits the ciphertext to the protected module 108. The receiver component 116 receives the ciphertext, and the decrypter component 124 decrypts the ciphertext utilizing the secret key 204, resulting in the nonce and the purported password. The comparer component 122 then compares the nonce decrypted from the ciphertext with the nonce known to be sent to the client computing device 106 by the protected module 108 to determine whether the received nonce is invalid or already used. If the received nonce is invalid, the protected module 108 transmits a value to the authentication server 102 indicating that the client computing device 106 is not to be provided access to the service 104. Otherwise, the protected module 108 optionally updates its internal state to indicate that the nonce has been used. In another exemplary embodiment, if the nonce is time-based, marking the nonce as used may be unnecessary, as the nonce may time out. The protected module 108 thereafter authenticates the purported password in any suitable manner, such as one of those described above.

While the systems 100 and 200 in FIGS. 1 and 2 have depicted a single protected module in communication with the authentication server 102, it is to be understood that in other embodiments, the authentication server 102 may have a plurality of protected modules 108 in communication therewith for purposes of high availability and/or redundancy. Moreover, the registration/authentication techniques described above can be employed in a distributed system, where multiple protected modules are in communication with different authentication servers. In such an embodiment, the protected modules are configured to retain keys such that they are unable to be removed from the respective protected modules; however, such keys can be placed into the protected modules from an authenticated administrator. Accordingly, one hundred protected modules can be placed in communication with a plurality of servers, and the same key can be included in all of such protected modules. Again, however, none of the protected modules is able to release such key.

Figure 3:
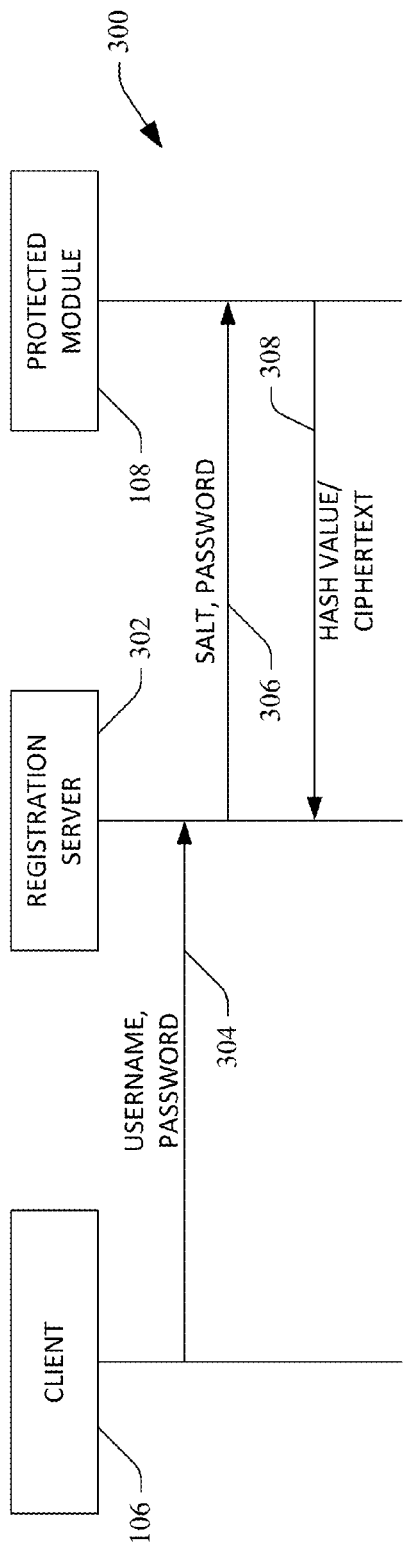
FIG. 3 is a control flow diagram illustrating exemplary communications between a client computing device, a registration server, and a protected module during user registration with a service.

Now referring to FIG. 3, a control flow diagram 300 that illustrates registration of a user with a service in a manner that prevents offline dictionary attacks is illustrated. The control flow diagram 300 illustrates communications undertaken between the client computing device 106, a registration server 302, and the protected module 108. At 304, the client computing device 106 transmits a username and password to utilize when registering with a service. The registration server 302 receives the username and password, and responsive to receiving this information, generates a salt corresponding to the username. Optionally, the registration server 302 generates some user identifier other than the username. The registration server 302 then transmits data to the protected module 108 at 306. Such data can comprise the salt and the password.

In another exemplary embodiment, the registration server 302 can concatenate the hash and the password and execute a hash function over such concatenation to generate a hash value.

Responsive to receiving the data from the registration server 302, the protected module 108 utilizes the key 110 to encrypt or protect such data. In an exemplary embodiment, the protected module 108 can concatenate the password, the salt, and the key 110, and can execute a hash function over such concatenation to generate a first hash value. The protected module 108, at 308, can transmit the first hash value to the registration server 302, which then retains the first hash value as a portion of the entry for the username (or other user ID). The registration server 302 deletes the password originally provided by the client computing device 106.

In another exemplary embodiment, the protected module 108 can generate a hash of the concatenation of the password and the salt (or receive such hash value from the registration server 302), and may then execute an encryption algorithm over such hash value, thereby encrypting the resulting hash value with the key 110. The protected module 108, at 308, may then transmit the resulting ciphertext to the registration server 302, which can cause the ciphertext to be retained in the user's record in the password database 114. While the embodiments described above refer to utilization of a salt in connection with generating a hash value, it is to be understood that the salt, in some of these embodiments, may be optional. For instance, if the protected module 108 encrypts the password using a nondeterministic (random) asymmetric encryption algorithm, the resulting encoding would not need additional salt to ensure that two encrypted values could not be compared.

Figure 4:
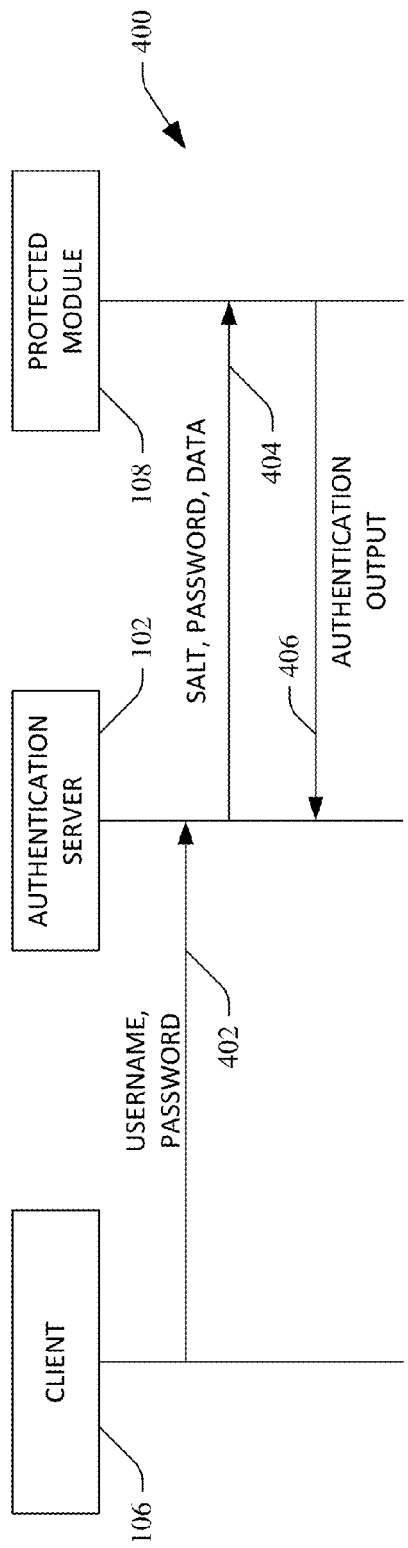
FIG. 4 is a control flow diagram illustrating exemplary communications undertaken between a client computing device, an authentication server, and a protected module during authentication of a password of a user.

With reference now to FIG. 4, an exemplary control flow diagram 400 illustrating communications undertaken between the client computing device 106, the authentication server 102, and the protected module 108 during authentication of a password set forth by the client computing device 106 is depicted. At 402, the client computing device 106 sets forth a username and password to the authentication server 102. Responsive to receiving the username and password, at 404, the authentication server 102 transmits the purported password from the client computing device 106 and data from the password database 114 corresponding to the username to the protected module 108. In an exemplary embodiment, such data can include a salt corresponding to the username and a first hash value previously generated at the protected module 108. In accordance with such embodiment, the protected module 108 may generate a concatenation of the purported password, the salt, and the key 110 to generate a second hash value. The protected module 108 can then compare the first hash value with the second hash value. At 406, the protected module 108 transmits an authentication output, where the authentication output is indicative of a difference between the first hash value and the second hash value.

In another exemplary embodiment, at 404, the data transmitted from the authentication server 102 to the protected module 108 can be ciphertext previously generated by the protected module (and the purported password). The protected module 108 can decrypt the ciphertext utilizing the key 110 (where the key 110 is a decryption key), resulting in a first hash value. The protected module 108 may then subsequently concatenate the password and the salt and execute a hash function over such concatenation, thereby generating a second hash value. The protected module 108 may then compare the first hash value with the second hash value and output an authentication output at 406 based upon such comparison. That is, if the first hash value is equivalent to the second hash value, then it can be ascertained that the purported password is equivalent to the password registered for the user (the correct password). Otherwise, an incorrect password has been submitted by the client computing device 106, and the authentication server 102 can prevent access to the requested service to the client computing device 106.

Figure 5:
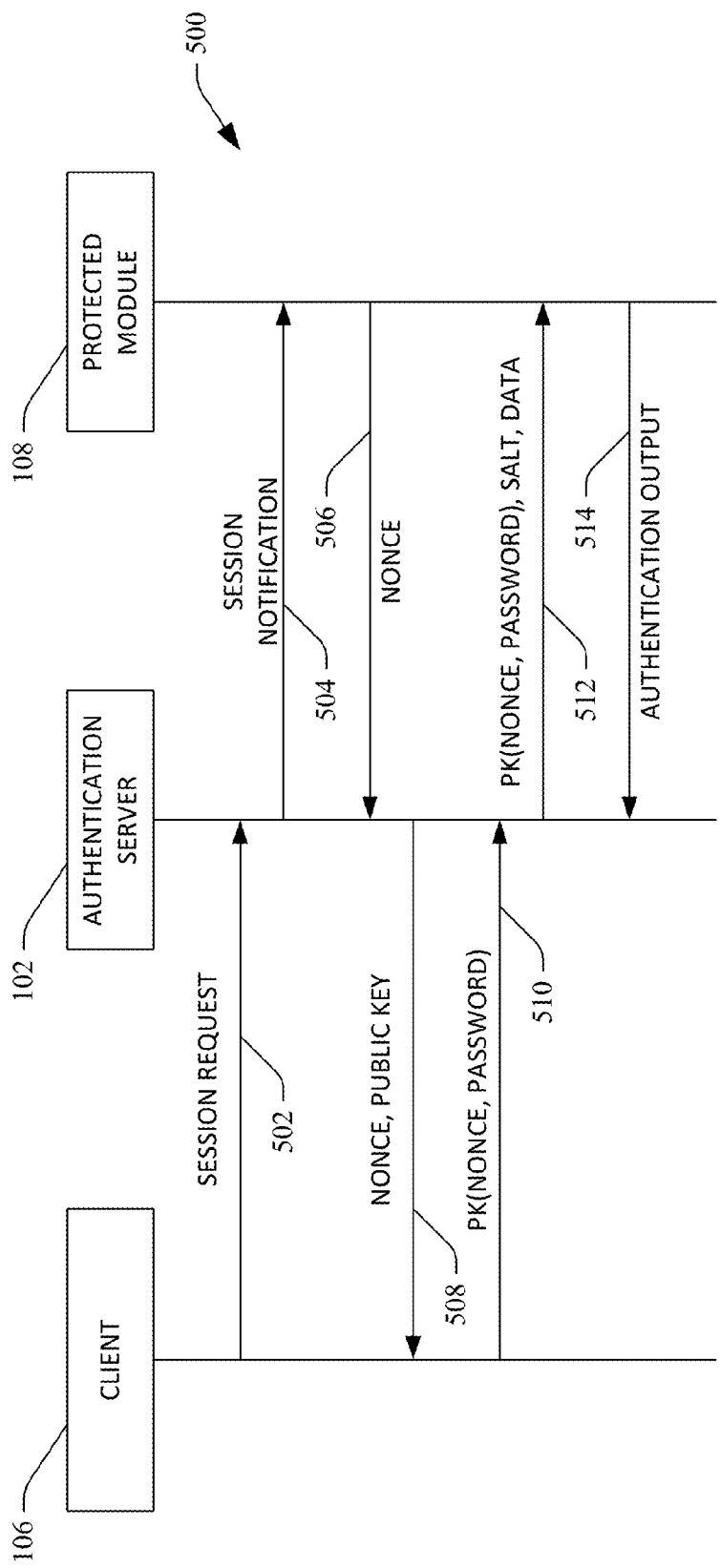
FIG. 5 is a control flow diagram illustrating exemplary communications between a client computing device, an authentication server, and a protected module when a secure communications channel is established between the client computing device and the protected module.

Turning now to FIG. 5, an exemplary control flow diagram 500 that illustrates communications undertaken between the client computing device 106, the authentication server 102, and the protected module 108 when a secure connection between the client computing device 106 and the protected module 108 is desired is depicted. At 502, the client computing device 106 transmits data that indicates that an authentication session is requested with the authentication server 102. Responsive to receiving such request, the authentication server 102, at 504, transmits a session notification to the protected module 108. The protected module 108 then generates a nonce and transmits the nonce to the authentication server 102 at 506. Responsive to receiving the nonce, the authentication server 102 transmits the nonce to the client computing device 106 at 508, also providing the protected module's public key if the client does not already have it. The authentication server 102 may also transmit a certificate to the client indicating that the association between this public key and a protected module is attested to by some trusted third party.

The client computing device 106 then utilizes the public key to encrypt a string that includes the purported password desirably set forth by the client computing device 106 and the nonce, resulting in creation of ciphertext. Such ciphertext is transmitted to the authentication server 102 at 510, together with a username. The authentication server 102 then accesses the password database 114 to retrieve, for instance, a salt and other data (e.g., a hash value or ciphertext), and transmits such information as well as the ciphertext provided by the client computing device 106 to the protected module 108 at 512. The protected module 108 then uses its secret key to decrypt the ciphertext generated at the client computing device 106, thereby obtaining the nonce. The protected module 108 subsequently determines whether the nonce is invalid or already used. If the nonce is invalid or already used, the protected module 108 transmits a message to the authentication server 102 at 514 that indicates that the client computing device 106 is not authenticated. Otherwise the protected module 108 updates its internal state. Subsequently, authentication of the user password can be undertaken as described above.

Figure 6:
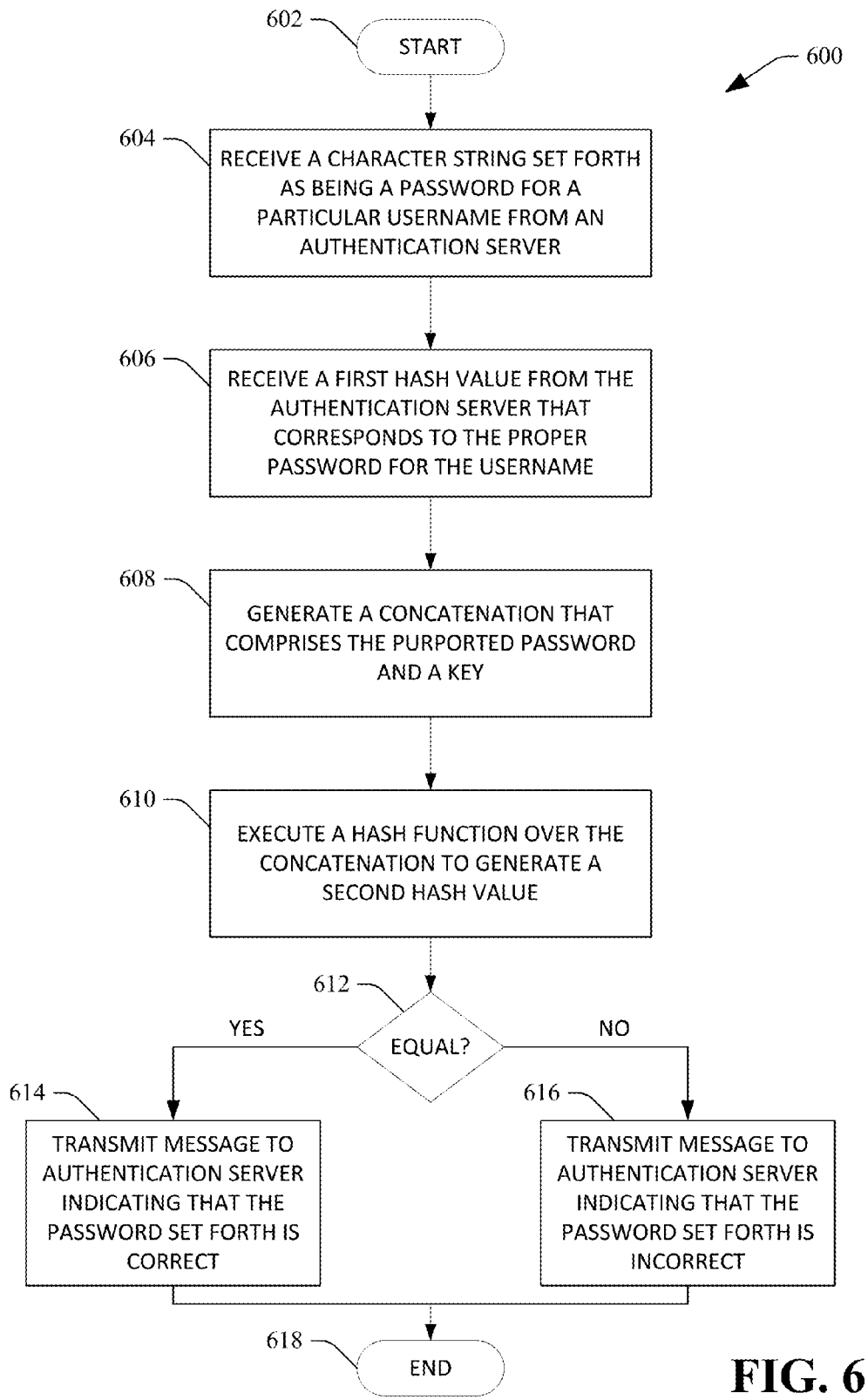
FIG. 6 is a flow diagram that illustrates an exemplary methodology that can be executed on a protected module for authenticating a purported password in a manner that prevents offline dictionary attacks.
Figure 7:
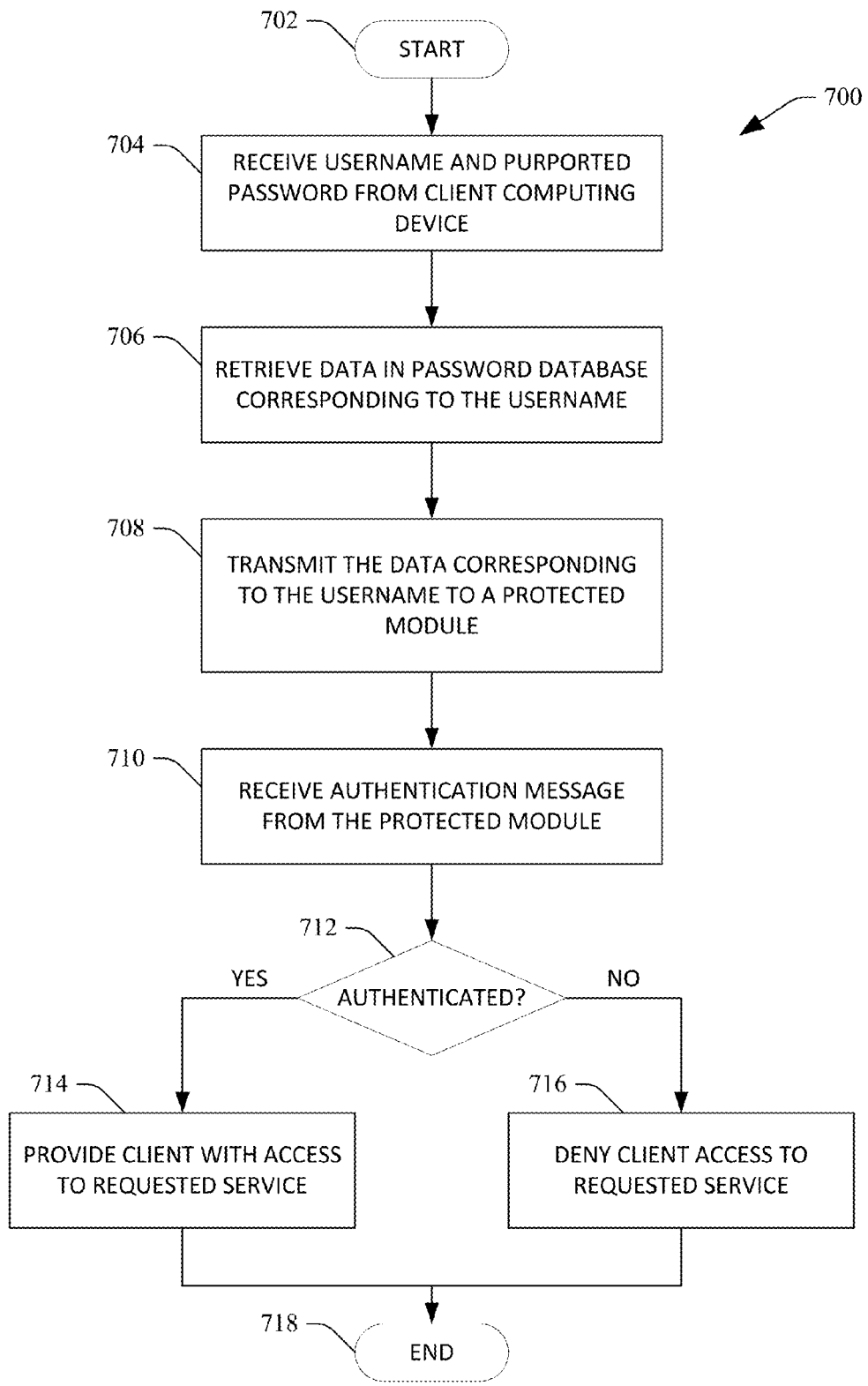
FIG. 7 is a flow diagram that illustrates an exemplary methodology that can be executed on an authentication server for authenticating a user password in a manner that prevents offline dictionary attacks.

With reference now to FIGS. 6-7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

With reference now to FIG. 6, an exemplary methodology 600 that can be undertaken at a protected module is illustrated. The methodology 600 starts at 602, and at 604 a purported password that corresponds to a username is received from an authentication server. At 606, a first hash value is received from the authentication server, the first hash value being previously generated through execution of a hash function over a string that comprises a concatenation of a proper (actual) password that corresponds to the username and a key, the key being restricted to the trusted protected module. At 608, a second string that comprises a concatenation of the purported password and the key is generated, and at 610 the hash function is executed over the second string to generate a second hash value. At 612, a determination is made regarding whether the first hash value is equivalent to the second hash value. If the first hash value is equivalent to the second hash value, then at 614 a message is transmitted to the authentication server that indicates that the password set forth by the client computing device is correct. If the first hash value and the second hash value are not equal, then at 616 a message is transmitted to the authentication server that indicates that the password set forth by the client computing device is incorrect. The method 600 completes at 618.

Now referring to FIG. 7, an exemplary methodology 700 that can be undertaken in an authentication server that facilitates prevention of offline dictionary attacks is illustrated. The methodology 700 starts at 702, and at 704 a username and purported password for that username are received from a client computing device. At 706, data is retrieved from a password database that corresponds to the proper username. As indicated above, this data can comprise a salt, a hash value and/or ciphertext. At 708, the retrieved data is transmitted to a protected module, and at 710 an authentication message is received from the protected module.

At 712, a determination is made regarding whether the password has been authenticated based at least in part upon the authentication message received at 710. If the password has been authenticated, then at 714 the client computing device is provided with access to the requested service. If at 712 it is determined that the password is not authenticated, then at 716 the client computing device is denied access to the requested service. The methodology 700 completes at 718.

Figure 8:
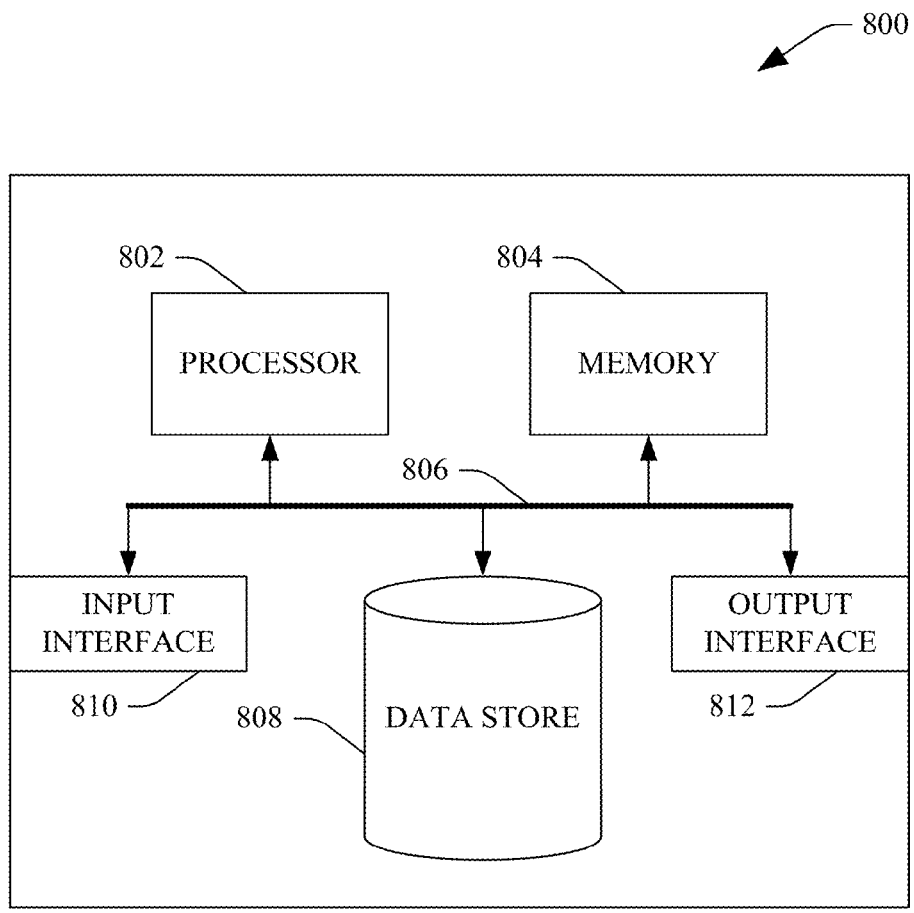
FIG. 8 is an exemplary computing system.

Now referring to FIG. 8, a high-level illustration of an exemplary computing device 800 that can be used in accordance with the systems and methodologies disclosed herein is illustrated. For instance, the computing device 800 may be used in a system that supports authenticating a password through utilization of a protected module. In another example, at least a portion of the computing device 800 may be used in a system that supports establishing a secure communications channel between a client computing device the protected module. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store a symmetric key, a public key, a private key, etc.

The computing device 800 additionally includes a data store 808 that is accessible by the processor 802 by way of the system bus 806. The data store may be or include any suitable computer-readable storage, including a hard disk, memory, etc. The data store 808 may include executable instructions, a password database, an audit log, a public key, a private key, a symmetric key, etc. The computing device 800 also includes an input interface 810 that allows external devices to communicate with the computing device 800. For instance, the input interface 810 may be used to receive instructions from an external computer device, a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A secure cryptographic processor, comprising:
    a processor; and
    memory that is operably coupled to the processor, the memory comprising a key generated by the processor, the key unable to be removed from the memory of the secure cryptographic processor, the memory further comprising instructions that, when executed by the processor, cause the processor to perform acts comprising:
        in response to an authentication server receiving a username and corresponding password that is to be registered with an online service, using the key to encrypt first data to generate first ciphertext, the first data based upon the password;
        transmitting the first ciphertext to the authentication server for retention in a password database, wherein passwords in the password database are each encrypted based upon the key;
        responsive to the authentication server receiving a request to authenticate to the online server with a purported password for the username, receiving from the authentication server:
            the purported password for the username; and
            the first ciphertext;
        decrypting the first ciphertext utilizing the key to generate the first data;
        computing a hash of a data packet that comprises the purported password received from the authentication server to generate second data;
        comparing the first data with the second data; and
        transmitting a signal to the authentication server that is indicative of whether there is a difference between the first data and the second data.

2. The secure cryptographic processor of claim 1 being a hardware security module.

3. The secure cryptographic processor of claim 1 being a Trusted Platform Module.

4. The secure cryptographic processor of claim 1, the first data being a first hash that is based upon the password and the second data being a second hash that is based upon the purported password.

5. The secure cryptographic processor of claim 1, the acts further comprising receiving a salt corresponding to the username from the authentication server, the first data is a hash of a concatenation of the password and the salt, the data packet additionally comprises the salt, and the second data is a hash of a concatenation of the purported password and the salt.

6. The secure cryptographic processor of claim 1, the acts further comprising maintaining an audit log that indicates which usernames have had passwords submitted therefor to the authentication system, at least a portion of the audit log being at least one of encrypted through utilization of the key or signed through utilization of the key.

7. The secure cryptographic processor of claim 1, the memory further comprising a public key that is shared with other computing devices and a secret key that is restricted to the memory of the secure cryptographic processor, the acts further comprising:
    generating a nonce responsive to receiving an indication from the authentication server that a client computing device has requested a session with the authentication server; and
    transmitting the nonce to the authentication server to facilitate establishing a secure connection between the secure cryptographic processor and the client computing device.

8. The secure cryptographic processor of claim 7, the acts further comprising receiving an encrypted data packet generated from the client computing device, the encrypted data packet includes the nonce; and
    wherein decrypting the first ciphertext utilizing the key to generate the first data comprises decrypting the data packet through utilization of the secret key to obtain the nonce, and the secure cryptographic processor authenticates the purported password only if the nonce obtained through decrypting the data packet is valid.

9. The secure cryptographic processor of claim 8, the encrypted data packet further comprises the password.

10. The secure cryptographic processor of claim 1 being one of a plurality of secure cryptographic processors that are in communication with the authentication server.

11. A method executed by a computer processor in a secure cryptographic processor, the method comprising:
    when a password for a username is presented for registration with an online service:
        receiving, from an authentication server, first data that is indicative of the password;
        encrypting the first data with a key to form first ciphertext, the key restricted to the secure cryptographic processor such that they key is unable to be extracted from the secure cryptographic processor;
        transmitting the first ciphertext to the authentication server for retention in a password database, the password database comprises a plurality of passwords that are each encrypted with the key;
    when a purported password for the username is presented for authentication to the online service:
        receiving, from the authentication server:
            a data packet that comprises the purported password for the username; and
            the first ciphertext;
        decrypting, with the key, the first ciphertext to form the first data;
        computing a hash of the data packet that comprises the purported password to form second data;
        comparing the first data formed by way of decrypting the ciphertext with the second data; and transmitting a signal to the authentication server that is indicative of whether there is a difference between the first data and the second data.

12. The method of claim 11, the secure cryptographic processor is a hardware security module.

13. The method of claim 11, the secure cryptographic processor is a Trusted Platform Module.

14. The method of claim 11, the password represented in the first data is a proper password and the second data comprises the purported password.

15. The method of claim 11, further comprising receiving a salt corresponding to the username from the authentication server, the first data is a hash of a concatenation of the password and the salt, the data packet additionally comprises the salt, and the second data is a hash of a concatenation of the purported password and the salt.

16. The method of claim 11, further comprising:
updating an audit log responsive to receiving the purported password, wherein updating the audit log comprises:
indicating in the audit log that the purported password has been submitted for the username; and
indicating in the audit log either that the purported password matches the password or that the purported password is different from the password.

17. The method of claim 11, further comprising:
prior to receiving the purported password from the authentication server, receiving an indication from the authentication server that a client computing device has initiated a communication session with the authentication server;
responsive to receiving the indication, generating a nonce; and
transmitting the nonce to the authentication server for transmittal to the client computing device.

18. The method of claim 17, further comprising:
subsequent to transmitting the nonce to the authentication server, receiving second ciphertext from the authentication server, the second ciphertext being indicative of the nonce and the purported password encrypted through utilization of a public key;
decrypting the ciphertext through utilization of a secret key to obtain the nonce, the secret key being restricted to the secure cryptographic processor; and
authenticating the purported password only if the nonce is valid.

19. The method of claim 11, the secure cryptographic processor is one of a plurality of secure cryptographic processors that are in communication with the authentication server.

20. A computer-readable medium in a secure cryptographic processor comprising instructions that, when executed by a processor in the secure cryptographic processor, cause the processor to perform acts comprising:
in response to a password for a username being presented for registration with an online service:
receiving, from an authentication server, first data that includes the password;
encrypting the first data with a key to form first ciphertext, the key has been generated by the secure cryptographic processor and is unable to be removed from the cryptographic processor; and
transmitting the first ciphertext to the authentication server for retention in a password database, wherein passwords in the password database are each encrypted through use of the key;
in response to a purported password for the username being presented for authentication at the online service:
receiving, from the authentication server, a purported password for the username and the first ciphertext;
decrypting, with the key, the first ciphertext to facilitate generating the first data;
computing a hash of a data packet that includes the purported password to facilitate generating of second data;
comparing the first data with the second data; and
transmitting a signal to the authentication server that is indicative of whether the first data matches the second data.

* * * * *